United States Patent
Jussel et al.

(10) Patent No.: US 10,820,972 B2
(45) Date of Patent: Nov. 3, 2020

(54) DENTAL FURNACE

(75) Inventors: Rudolf Jussel, Feldkirch-Gisingen (AT); Philipp Kettner, Rankweil (AT)

(73) Assignee: Ivoclar Vivadent AG, Schaan (LI)

( * ) Notice: Subject to any disclaimer, the term of this patent is extended or adjusted under 35 U.S.C. 154(b) by 215 days.

(21) Appl. No.: 13/555,282

(22) Filed: Jul. 23, 2012

(65) Prior Publication Data

US 2013/0026157 A1    Jan. 31, 2013

(30) Foreign Application Priority Data

Jul. 25, 2011  (EP) .................................. 11 175 226

(51) Int. Cl.
*H05B 6/80* (2006.01)
*F27D 11/00* (2006.01)
(Continued)

(52) U.S. Cl.
CPC ............ *A61C 13/20* (2013.01); *A61C 13/203* (2013.01)

(58) Field of Classification Search
CPC .......... F27B 17/02; F27B 17/025; F27B 7/42; F27B 7/26; F27B 5/14; A61C 13/20; A61C 13/203; A61C 13/081; A61C 19/003; A61C 19/004; A61C 13/0024; F27D 21/0014; F27D 19/00; C21D 9/56; C21D 11/00; H05B 6/645; H05B 6/642; H05B 6/666; H05B 6/6411; H05B 6/6455
(Continued)

(56) References Cited

U.S. PATENT DOCUMENTS

| 2,054,894 A * | 9/1936 | Busch ..................... A61C 13/16 |
| | | 106/38.35 |
| 2,551,932 A * | 5/1951 | Dimmer .................. A61C 13/20 |
| | | 106/38.35 |

(Continued)

FOREIGN PATENT DOCUMENTS

| DE | 4303458 C1 | 1/1994 |
| GB | 332194 | 7/1930 |

(Continued)

OTHER PUBLICATIONS

Pete Walter, Is your dryer optimized to get your desired product? Oct. 11, 2005 (Year: 2005).*

(Continued)

*Primary Examiner* — Ibrahime A Abraham
*Assistant Examiner* — Gyounghyun Bae
(74) *Attorney, Agent, or Firm* — Ann M. Knab; Thad McMurray

(57) ABSTRACT

This invention relates to a device for drying at least one object containing a liquid, in particular a dental restoration object (12). Said device comprises a means for generating thermal energy acting upon the object and sufficient for increasing the temperature of the object to the boiling point. Moreover, the device includes an impingement area for impinging on the object with thermal energy and a control device (24) that is characterized by the fact that a temperature detection element (20) of the device (10) measures the temperature of the object (12), and upon reaching a trigger temperature that is at the boiling temperature, somewhat below or somewhat above thereof, emits a signal to the control device.

22 Claims, 1 Drawing Sheet

(51) Int. Cl.
*F27D 11/12* (2006.01)
*F27D 19/00* (2006.01)
*A61C 13/20* (2006.01)

(58) Field of Classification Search
USPC ....... 219/704–706, 709, 680, 681, 685, 686,
219/736, 737, 751, 710, 711, 720, 411,
219/400, 412, 506, 539, 390, 393, 708,
219/756; 264/432, 434; 432/4, 18,
432/19–26, 31–32, 34, 36, 90–91,
432/120–223, 262; 433/218–221, 223,
433/215–228.1, 168.1, 202.1–212.1,
433/213–214; 702/130, 134, 173
See application file for complete search history.

(56) References Cited

U.S. PATENT DOCUMENTS

| | | | | |
|---|---|---|---|---|
| 3,057,078 A * | 10/1962 | Nat Gold | ............... | A61C 13/20 34/552 |
| 3,061,415 A | 10/1962 | Braconier et al. | | |
| 3,109,911 A * | 11/1963 | Kremer | ............... | A61C 13/20 219/390 |
| 3,350,789 A * | 11/1967 | Davies | ............... | 34/486 |
| 3,698,098 A * | 10/1972 | Ramsay | ............... | D06C 7/00 34/403 |
| 3,819,392 A * | 6/1974 | Weldes et al. | ............... | 106/287.11 |
| 3,925,422 A * | 12/1975 | Schaafsma | ............... | C07D 311/74 549/290 |
| 4,208,573 A * | 6/1980 | Risse | ............... | 219/411 |
| 4,300,037 A * | 11/1981 | Padden | ............... | F27B 17/02 219/492 |
| 4,381,918 A * | 5/1983 | Ehrnford | ............... | A61C 13/14 523/115 |
| 4,498,865 A * | 2/1985 | Schulmeyer | ............... | A61C 13/20 432/18 |
| 4,585,417 A * | 4/1986 | Sozio | ............... | A61C 13/0003 264/19 |
| 4,661,071 A * | 4/1987 | Bell | ............... | A61C 13/0003 106/35 |
| 4,671,770 A * | 6/1987 | Bell | ............... | A61C 13/0003 106/35 |
| 4,695,705 A * | 9/1987 | Kulig | ............... | 392/418 |
| 4,771,162 A * | 9/1988 | Schatz | ............... | A61C 13/14 126/21 A |
| 4,796,688 A * | 1/1989 | Gundlach | ............... | B22D 25/00 164/155.6 |
| 4,898,476 A * | 2/1990 | Herrmann | ............... | G01N 25/68 324/664 |
| 4,963,709 A * | 10/1990 | Kimrey, Jr. | ............... | 219/686 |
| 5,007,837 A | 4/1991 | Werly | | |
| 5,072,360 A * | 12/1991 | Knorpp | ............... | F27B 17/02 110/192 |
| 5,134,263 A * | 7/1992 | Smith et al. | ............... | 219/682 |
| 5,266,777 A * | 11/1993 | Oppawsky et al. | ............... | 219/400 |
| 5,318,754 A * | 6/1994 | Collins et al. | ............... | 422/109 |
| 5,335,425 A * | 8/1994 | Tomizawa | ............... | F26B 3/347 34/265 |
| 5,347,454 A * | 9/1994 | Mushabac | ............... | A61C 13/0004 433/214 |
| 5,362,438 A * | 11/1994 | van der Zel | ............... | A61C 13/0003 419/28 |
| 5,367,002 A * | 11/1994 | Huang | ............... | A61K 6/0017 523/115 |
| 5,667,386 A | 9/1997 | Black et al. | | |
| 5,776,382 A * | 7/1998 | Kim | ............... | A61C 13/0003 264/16 |
| 5,859,412 A * | 1/1999 | Yagi | ............... | 219/704 |
| 5,872,160 A * | 2/1999 | Liang | ............... | A61K 6/0026 523/120 |
| 5,884,688 A * | 3/1999 | Hinton et al. | ............... | 164/527 |
| 5,980,962 A * | 11/1999 | Bracken et al. | ............... | 426/241 |
| 5,981,919 A * | 11/1999 | Masten, Jr. | ............... | C21D 1/34 148/511 |
| 5,983,711 A * | 11/1999 | Pappas | ............... | G01N 5/025 374/14 |
| 6,013,125 A * | 1/2000 | Quraishi et al. | ............... | 106/38.35 |
| 6,015,230 A * | 1/2000 | Wantz | ............... | G08B 29/145 340/515 |
| 6,048,202 A | 4/2000 | Jensen et al. | | |
| 6,133,558 A * | 10/2000 | Ueda et al. | ............... | 219/682 |
| 6,157,004 A * | 12/2000 | Bizzio | ............... | 219/390 |
| 6,227,041 B1* | 5/2001 | Collins | ............... | G01N 5/045 219/711 |
| 6,268,012 B1* | 7/2001 | Sikora | ............... | A23L 3/40 426/465 |
| 6,324,341 B1* | 11/2001 | Riley | ............... | H01L 21/67115 118/50.1 |
| 6,350,973 B2* | 2/2002 | Wroe et al. | ............... | 219/680 |
| 6,386,865 B1 | 5/2002 | Suh et al. | | |
| 6,441,354 B1* | 8/2002 | Seghatol | ............... | A61C 5/00 219/679 |
| 6,480,672 B1 | 11/2002 | Rosenzweig et al. | | |
| 6,566,637 B1* | 5/2003 | Revesz | ............... | G01N 22/00 219/679 |
| 7,335,861 B2 | 2/2008 | Gama et al. | | |
| 7,581,876 B2* | 9/2009 | Revesz | ............... | G01N 5/045 219/680 |
| 7,704,898 B2 | 4/2010 | Nenyei et al. | | |
| 7,910,153 B2 | 3/2011 | Kawagoe et al. | | |
| 8,109,761 B1* | 2/2012 | Neal | ............... | F27B 17/025 219/390 |
| 8,317,512 B2 | 11/2012 | Jussel | | |
| 8,487,220 B2* | 7/2013 | Serrago | ............... | F27B 17/025 219/390 |
| 2001/0001980 A1 | 5/2001 | Drake et al. | | |
| 2002/0008334 A1* | 1/2002 | Gheorghiu | ............... | F27B 17/00 264/432 |
| 2002/0183724 A1 | 12/2002 | Neev | | |
| 2004/0053200 A1* | 3/2004 | Kato | ............... | A61C 13/20 433/215 |
| 2004/0173142 A1* | 9/2004 | Willis | ............... | F27B 14/00 117/200 |
| 2004/0182538 A1* | 9/2004 | Lambrecht | ............... | A61C 13/20 164/457 |
| 2004/0187341 A1* | 9/2004 | Studd | ............... | F26B 15/12 34/402 |
| 2006/0075784 A1* | 4/2006 | Mersmann et al. | ............... | 65/158 |
| 2006/0086480 A1* | 4/2006 | Kugelgen | ............... | B22C 9/04 164/516 |
| 2006/0088077 A1 | 4/2006 | Jussel et al. | | |
| 2006/0240376 A1 | 10/2006 | Plank et al. | | |
| 2007/0023971 A1* | 2/2007 | Saha et al. | ............... | 264/432 |
| 2008/0039592 A1* | 2/2008 | Sawada | ............... | A61K 6/0017 525/416 |
| 2008/0081317 A1* | 4/2008 | White | ............... | A61C 13/00 433/213 |
| 2008/0096148 A1* | 4/2008 | Jussel | ............... | A61C 13/20 432/32 |
| 2008/0237211 A1* | 10/2008 | Jussel | ............... | A61C 13/20 219/390 |
| 2009/0180118 A1* | 7/2009 | Feichtinger | ............... | F27B 17/025 356/402 |
| 2009/0226855 A1* | 9/2009 | Rohner | ............... | A61C 13/20 432/4 |
| 2009/0246739 A1* | 10/2009 | Jussel | ............... | A61C 13/20 433/223 |
| 2010/0047731 A1* | 2/2010 | Zubler | ............... | A61C 13/20 432/45 |
| 2010/0052189 A1* | 3/2010 | Sakurai | ............... | H01L 24/11 257/778 |
| 2010/0140450 A1 | 6/2010 | Duret et al. | | |
| 2010/0141231 A1* | 6/2010 | Duchene | ............... | H02M 5/2573 323/300 |
| 2011/0006450 A1* | 1/2011 | Stephan | ............... | A61C 13/203 264/16 |
| 2011/0297665 A1* | 12/2011 | Parker | ............... | H05B 3/22 219/494 |

(56) References Cited

U.S. PATENT DOCUMENTS

2012/0015318 A1\* 1/2012 Kasenbacher ....... A61C 1/0046
433/29

FOREIGN PATENT DOCUMENTS

| JP | 10033564 A | 2/1998 |
| JP | 2004057922 A | 2/2004 |
| JP | 2006097112 A | 4/2006 |
| JP | 2009233330 A | 10/2009 |

OTHER PUBLICATIONS

Middle School Chemistry, Mar. 1, 2011, 2011 American Chemical Society (Year: 2011).\*

\* cited by examiner

DENTAL FURNACE

CROSS-REFERENCE TO RELATED APPLICATIONS

This application claims the benefit of EP Application No. 11175226.7 filed Jul. 25, 2011, which is hereby incorporated by reference in its entirety.

TECHNICAL FIELD

The present invention relates generally to a drying device, and in particular a drying device for a dental object. The present invention also relates to a drying method, and in particular, a drying method for a dental object.

BACKGROUND

For the drying of dental restoration parts it has been known for a long time to either use separate drying devices with infrared radiators or, to remove the moisture within dental furnaces themselves.

One example for a solution of this kind is evident from GB 332 194. In this solution it is checked whether moisture is still emitted after a period of 20 minutes by verifying if a cold minor placed at an outlet opening, still gets steamed up.

Moreover, specific low-pressure humidity removal or dehumidification devices for the drying of dental restoration parts have become known that work with temperature sensors. With solutions of this kind, both low pressure and temperature can be measured and displayed, and the drying operation may be set according to the request and instruction of the manufacturer of the dental restoration part.

Moreover, it has also already been proposed to dry a dental restoration part during the closing operation of a firing furnace and in this connection to control the closing operation so that the drying time is sufficient, but not too long. In this connection, several sensors for determining the interior temperature of the dental furnace and further sensors can be employed, too.

The known solutions, however, have the disadvantage that as a precaution, a certain minimum time must always be adhered to, in order to ensure that a safe drying operation takes place. In this respect, the best solution despite its age is still the solution according to the above-mentioned British patent document, since the humidity or moisture within the furnace interior is explicitly used here as a criterion for the existence of residual moisture.

With multi-unit bridges consisting of a ceramic with a specific porosity, residual moisture may remain which can considerably reduce the quality of the dental restoration part during the firing operation. A heating-up of a dental restoration part that is wet inside, for example to 700° C., would result in porosities and/or defects such as cracks that can even destroy the dental restoration part.

In order to safely prevent this effect, specific drying devices have become accepted that often work with infrared drying or curing lamps or that are configured as drying cabinets. In this respect, the dental restoration part is heated to an elevated temperature for a longer period of time such as for example one hour, in order to accelerate the drying process. In order to ensure the proper drying process also with larger dental restoration parts for example, a minimum time with a safety margin is experimentally preset. For the sake of convenience, said drying time also applies for different objects such as small objects or also for objects that have possibly already become dry due to a holding or exposure time, i.e., the time period between two processing operations.

It is to be understood that the evaporation temperature can be set to 100° C. only with pure water. Saline solutions may have an evaporation temperature of substantially more than 100° C., and solutions containing alcohol may have an evaporation temperature of for example only 80° C.

SUMMARY

The present invention is based on the object of providing a device for drying a wet object, in particular a dental restoration part that reliably enables a high quality of the object, in particular, a dental restoration part, without unduly prolonging the work processes, for example, in a dental laboratory.

This object is inventively solved by the attached claims, which are hereby incorporated by reference.

According to an embodiment of the invention it is particularly favorable that a temperature detection element is directed towards the object, i.e., particularly the dental restoration part, and detects the temperature thereof. In a particularly favorable manner the fact can thus be exploited that the object then has a temperature in the range of the boiling temperature of the liquid if it has not yet completely evaporated. Even if a temperature gradient in the object exists for example and the object is still wet inside, the temperature does not exceed a preset value during its wet condition.

In an advantageous embodiment of the invention, said value which also can be referred to as the "trigger temperature value" can be determined in advance, and a signal is inventively emitted to a control device if the trigger temperature value is exceeded.

In a further particularly favorable embodiment it is provided that the control device is configured in a suitable manner. If the drying device comprises a drying cabinet or an infrared lamp for the thermal treatment, the control device can turn them off and indicate that the dental restoration part is now ready for the firing process. If, however, the drying device itself comprises a firing furnace, the control device may be part of the firing furnace and can start the further heating-up thereof in order to immediately carry out the firing cycle.

The signal emission can thus be realized by emitting an electrical signal and/or optical or acoustic signals. It is also possible to transfer the dental restoration parts via some kind of robotic arm to the firing chamber of the firing furnace upon the occurrence of the signal from the infrared lamp and to initiate the firing cycle.

In an inventively particularly favorable manner it is provided to also take into consideration the temperature development of the object if the measured temperature of the temperature detection element substantially remains constant for a certain time. This behavior arises especially with multi-unit bridges or other large-volume dental restoration parts and may be attributed to the fact that the dental restoration part does not heat up beyond the boiling temperature while there still remains residual moisture in the dental restoration part. Therefore, the temperature development may also be used as an indicator.

It is also particularly favorable if based on the result of the measurement by means of the temperature detection element, the heat energy acting upon the object is controlled by the control device. Hereby, a temperature control, for example via a PID controller, may be realized for example, and any heating-up curve may be represented, and namely until the boiling temperature of the liquid in the object has been reached or has been slightly exceeded.

In an advantageous embodiment it is provided that subsequent to the drying process of the object that may be a dental restoration part or also any other dental object, the object is subjected to a further thermal treatment. The thermal treatment can be the firing of a dental ceramic part in a firing furnace or press furnace, or the firing of a ceramic green body consisting of ceramic particles and a solid organic matrix, which matrix in turn can consist of at least one organic compound.

The boiling temperature thus also refers to the decomposition temperature of this organic compound.

According to the invention it is favorable that a temperature plateau is overcome during the drying or decomposition operation, respectively. This temperature plateau arises during the heating of larger dental restoration parts such as multi-unit bridges, or during the debinding of organic matrixes. A thermal energy is necessary for the evaporation of the liquid or for the decomposition, respectively, which thermal energy is extracted from the object so that initially there is no further increase in temperature despite a constant or stable heat supply. This behavior is referred to as a temperature plateau and may be used to determine that the complete decomposition has taken place or that the humidity has been completely removed, respectively.

Temperature plateaus of this kind may be clearly below 100° C. in the case of alcohols such as ethanol or butanol, but in the case of the debinding of organic matrixes it may be at approximately 500° C., whereas in the latter case only a short liquid phase arises and then there is the transition to the gas phase. This is particularly important in the microwave-supported debinding process and may be exploited particularly well according to the invention.

Due to the temperature plateau practically any further heating-up of the object is automatically prevented temporarily. This is detected with the aid of the inventive temperature detection element. In this respect, it is important that the temperature detection element is exclusively directed towards the object and detects the temperature thereof, i.e., independently of the means for the generation of thermal energy acting upon the object.

Due to the evaporation heat, the temperature of the object remains at a temperature slightly below the boiling temperature, and towards the end of the temperature plateau there is a clear rise in temperature of the object whose temperature gradient approximately corresponds to the temperature gradient prior to reaching the temperature plateau.

In a first arrangement according to an embodiment of the invention it is provided that a drying cabinet or an infrared radiator are used as a means for generating thermal energy acting upon the object. The temperature detection element detects the temperature of the object on the side thereof or below it, but preferably at the position that is not impinged by an infrared radiator. When the trigger temperature is reached, the drying cabinet or the infrared radiation source is shut down. With small dental restoration parts no temperature plateau is obtained; rather, according to experience values, the trigger temperature is set to a value slightly below or slightly above the boiling temperature.

Analogously, this also applies for the debinding temperature, whereas during the debinding operation typically compounds are used that enable the realization of a temperature plateau.

As an alternative to the mentioned separate heating via an infrared light source or a drying cabinet it is also possible to employ a dental firing furnace for the drying operation. Preferably a dental firing furnace of a kind is used in which a firing chamber is provided in a firing chamber head which may be lifted off a firing chamber base. The lifting-off may be effected via a pure translational movement, but also via a pivotal movement or a combination of these movements.

The dental restoration part is then placed on the firing chamber floor, preferably via a firing tray, and for the drying operation, the firing chamber head is brought into a partially open position in which an annular gap extends between the firing chamber floor and the firing chamber head. The heating elements of the firing chamber head are turned on, and the heat emitted in this manner serves to dry the dental restoration part that is located on the firing chamber floor.

The control device can then either control the heat energy of the dental firing furnace or the position of the firing chamber head. The further the firing chamber head is moved upwards, the lower is the heat energy acting upon the object. With this solution a gap between the heat source and the object may be controlled in this respect; in both cases the heat energy acting upon the object may be controlled via the control device.

In the half-opened position of the firing chamber head, the dental restoration part can be easily located on the firing tray and can be removed therefrom, if necessary. As soon as the dental restoration part has been inserted, the temperature thereof is continuously measured and detected. When the trigger temperature is reached, for example a measured temperature of 105° C., the firing chamber head is quickly lowered. In this condition it can be assumed that the entire moisture has escaped from the dental restoration part.

If necessary, the escape of moisture can also be supported and enhanced by an air acceleration device. For this reason, a fan can be employed and also an exhaust device in the furnace head that generates an air stream across the object.

If necessary, a waiting time period is included for a short time after having reached the trigger temperature in order to realize a subsequent drying time of a few seconds that also serves to achieve the temperature homogenization or uniformity within the dental restoration part. As soon as the further heating up is to be initiated, the heating element is switched to full power and the firing chamber is closed. In this condition, after the closing of the firing chamber head, it can be sealed off against the firing chamber floor in a manner known per se and a partial vacuum is generated in the firing chamber. After having removed the residual moisture of the dental restoration part, the presence of water droplets within the suction line for the exhaust that gradually plug up the line can be favorably quasi automatically prevented According to an advantageous embodiment it is provided that a temperature detection element of the device measures the temperature of the object, and upon reaching a trigger temperature that is at the boiling temperature, somewhat below or somewhat above thereof, emits a signal to the control device.

According to an advantageous embodiment it is provided that the signal signalizes the end of the drying process and/or initiates a subsequent thermal treatment of the object.

According to an advantageous embodiment it is provided that the means for generating the thermal energy is formed by a heat source that emits heat with a wavelength of 780 nm to 15 μm.

According to an advantageous embodiment it is provided that the means for generating the heat energy comprises a microwave source.

According to an advantageous embodiment it is provided that the means for generating the heat energy is formed by at least one heating element of a dental firing furnace that comprises a firing chamber head and firing chamber bottom upon which the object is placed, wherein the firing chamber head for operating the drying device is preferably spaced apart from the firing chamber bottom a few centimeters, or is formed by an infrared light source.

According to an advantageous embodiment it is provided that the temperature detection element is responsive to a radiation with a wavelength between 780 nm and 1 mm, in particular between 800 nm and 15 µm, and is in particular arranged outside the area which is impinged with thermal energy, but is directed toward it.

According to an advantageous embodiment it is provided that the means for generating the thermal energy is formed by at least one heating element of a dental firing furnace and that the temperature detection element detects the temperature of the object through a gap formed between a firing chamber head and a firing chamber bottom, or through a viewing channel in the dental firing furnace that is covered with transparent glass.

According to an advantageous embodiment it is provided that the device comprises a blower or an air acceleration device for the drying operation, in particular the means for generating the thermal energy above the object, and/or a suction or exhaust device by which an air stream across the object may be generated for enhancing the drying operation.

According to an advantageous embodiment it is provided that the object is formed as a dental restoration part that in particular comprises a porosity and/or consists of a powder pile or material and in particular comprises ceramics and/or metal and/or plastic or mixtures of these materials.

According to an advantageous embodiment it is provided that the object is formed as a dental restoration part that is a ceramic green body consisting of ceramic particles and a solid organic matrix, which matrix in turn can be composed of at least one organic compound.

According to an advantageous embodiment it is provided that the control device controls the means for generating the thermal energy to a temperature that is clearly, in particular 30 to 50° C., above the boiling point of the liquid.

According to an advantageous embodiment it is provided that the control device emits a signal when the trigger temperature has been reached.

According to an advantageous embodiment it is provided that the signal turns off the heat source for generating thermal energy acting upon the object.

According to an advantageous embodiment it is provided that the control device turns on at least one heating element of the dental firing furnace which, in particular after the closing of the firing chamber, subjects a dental restoration part as an object to a further thermal treatment.

BRIEF DESCRIPTION OF THE DRAWINGS

Embodiments of the present invention will be more fully understood and appreciated by the following Detailed Description in conjunction with the accompanying drawings, in which.

DETAILED DESCRIPTION

Figure 1:
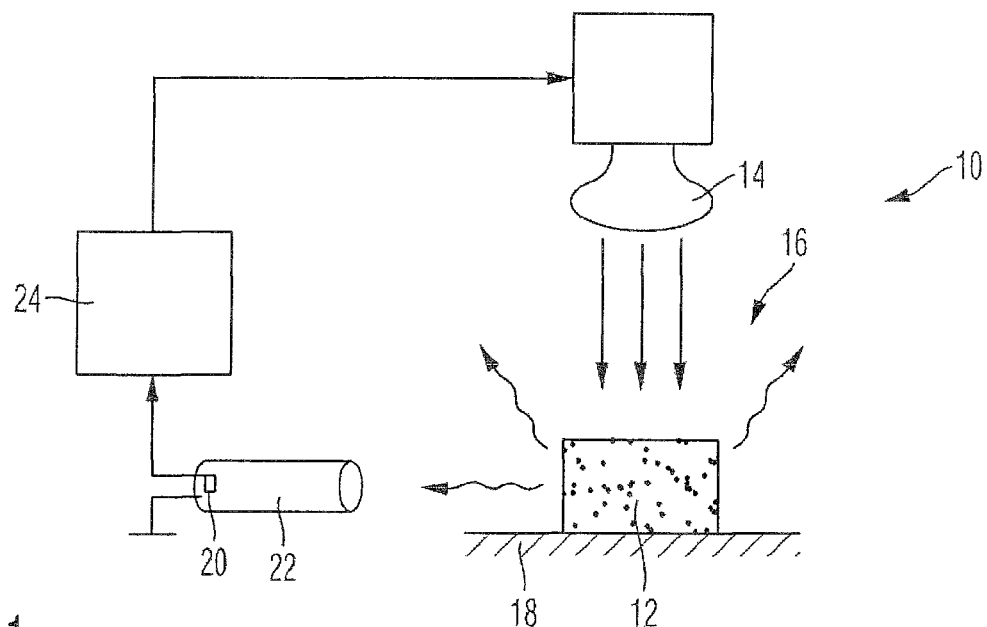
FIG. 1 shows a schematic view of a drying device according to the invention in an embodiment of the invention.

The inventive device 10 comprises an object, in particular a dental restoration part 12 that, in the illustrated embodiment, is represented as a schematic ashlar. The dental restoration part 12 consists of ceramics and/or metal and/or plastic and is porous. A liquid is contained in the object, for example an aqueous residual moisture, or the remainder of a coloring liquid that contains alcohol so that ethanol or buthanol or similar alcohols are contained.

In the present exemplary embodiment, an infrared light source 14 is provided as the device for generating thermal energy that acts upon the object, said infrared light source influencing the object 12 with heat from above. The aim in this case is the drying of the object, and the infrared light source 14 substantially emits the infrared light radiation in a conical manner. In this respect, an impingement area 16 is obtained below the radiation cone of the infrared light source.

If a drying cabinet is used instead, the impingement area is the entire drying cabinet.

The object is positioned on a base or support 18. Due to the impinging thermal energy, the object is gradually heated depending on its thermal capacity and the emitted amount of heat.

A temperature detection element 20 is laterally provided. The temperature detection element detects the infrared radiation, i.e., the heat radiation of the object 12. Preferably it comprises a shielding 22 that prevents the temperature detection element 20 from being directly impinged by the infrared light source 14. Moreover, it is located outside the impingement area 16.

The temperature detection element 20 is selected so that a spectral sensitivity range at least covers the infrared range. It is to be understood that depending on the application also a larger range that is shifted to larger wavelengths can be detected.

Moreover, the temperature detection element 20 is connected to a control device 24 that receives and evaluates the output signal of the temperature detection element.

If a trigger temperature is reached that has been selected and preset depending on the liquid in the object 12, the control device 24 itself emits a signal that turns off the infrared light source 14 in the illustrated exemplary embodiment. It is to be understood that any other signal can be generated instead, for example a signal for transferring the now dry dental restoration part 12 into the firing furnace.

Figure 2:
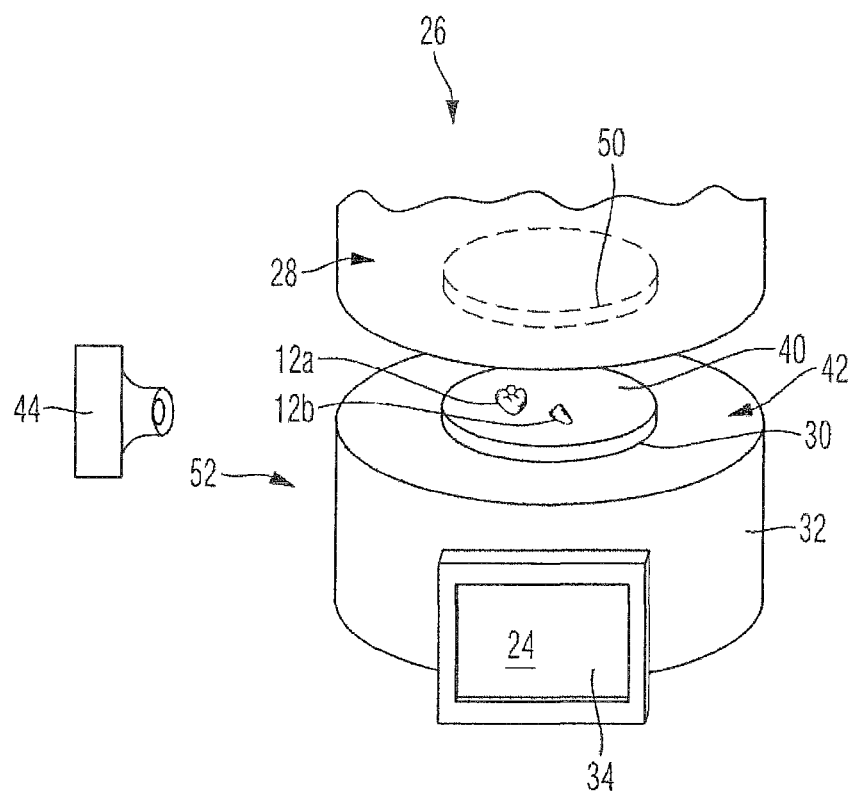
FIG. 2 shows a further schematic view of a further embodiment of a drying device according to the invention.

A further arrangement of an inventive drying device is apparent from FIG. 2. In this exemplary embodiment the drying device 10 uses a dental firing furnace 26. The dental firing furnace comprises a firing chamber head 28 and a firing chamber bottom 30 that is formed on a furnace lower part 32. The furnace lower part 32 further carries and supports a control display 34 in a manner known per se, by means of which the various functions and conditions of the dental firing furnace 26 can also be displayed, and by means of which the dental firing furnace can be controlled.

The firing chamber bottom 30 accommodates the dental restoration parts by means of a firing tray 40 and FIG. 2 shows two dental restoration parts 12a and 12b. The dental restoration parts can be multi-unit bridges or individual dental restoration parts having low weight.

The firing chamber head 28 is suspended via a combined lifting/pivoting device and is controllable with respect to its height position. In the illustrated position, a gap 42 exists between the bottom side of the firing chamber head and the firing chamber bottom 30. The dental restoration part 12 is laterally visible through the gap. A thermal imaging camera 44 is provided in this exemplary embodiment as the temperature detection element, which thermal imaging camera 44 is attached laterally to the gap 42, but spaced apart therefrom, and which is directed towards the one or more dental restoration parts 12 in its optics.

The thermal imaging camera 44 is laterally spaced apart from the dental firing furnace a distance so that it is not damaged by the heat radiation.

In the illustrated exemplary embodiment, a heating element 50 is formed in the firing chamber head in a manner known per se as circumferential electrical resistance heating. The heat emitted from the heating element heats the dental restoration part 12 even across the gap 42 so that the heating element may be regarded as a means for generating thermal energy that acts upon the object. The extent of the heat energy that is supplied at this position, strongly depends on the height position of the firing chamber head, and of course on the heating power of the heating element 50 or the heat energy, respectively, which is stored in the insulation of the firing chamber head.

According to an embodiment of the invention, the thermal imaging camera 44 is connected to the control device 24 via a wireless data link 52 for example. The control device 24 is informed about the temperature of the dental restoration part 12 hereby.

If the preset trigger temperature is reached, the control device 24 assumes that the residual moisture in the dental restoration part has evaporated or has escaped. The dental restoration part at this point in time is thus completely pre-dried.

For the start of the actual firing cycle, the firing chamber head 28 is then lowered in a manner known per se so that it seals off against the firing chamber bottom 30. The firing cycle is also carried out in a manner known per se, and if necessary, under negative pressure.

Typically, the firing cycle is concluded by a cooling phase that is advantageously also realized at a half-opened firing chamber head. Also in this position, the inventive thermal imaging camera 44 can detect and monitor the temperature of the dental restoration part 12 and thus enables the exact run of a preset temperature profile also during the cooling phase.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A device for drying a dental object containing a liquid, said device comprising
a drying cabinet, curing lamp, or firing furnace comprising a thermal energy source configured for generating thermal energy at a constant rate throughout the drying of the dental object and for increasing the temperature of the liquid in the dental object to a boiling point,
an impingement area for impinging on the dental object with the thermal energy,
a control circuit configured to detect a temperature plateau and control the thermal energy source to supply thermal energy at a constant rate during a drying process, and
a temperature sensor in communication with the control circuit to measure the temperature of the dental object and detect the temperature plateau whereby no further increase in the temperature of the dental object is detected despite the constant rate of the thermal energy, wherein the temperature plateau is no higher than 500° C., upon reaching the temperature plateau, the control circuit emits a signal to the drying cabinet, curing lamp, or firing furnace, and the drying is stopped.

2. The device according to claim 1, wherein a trigger temperature is below or above the boiling temperature.

3. The device according to claim 1, wherein when the control circuit receives the signal from the temperature sensor, the control circuit is configured to either signal the end of a drying process and/or initiates a subsequent thermal treatment of the dental object.

4. The device according to claim 1, wherein the thermal energy source comprises a heating element that emits heat with a wavelength of 780 nm to 15 µm.

5. The device according to claim 1, wherein the thermal energy source comprises a microwave source.

6. The device according to claim 1, wherein the thermal energy source comprises at least one heating element located in a dental firing furnace, wherein the dental firing furnace comprises a firing chamber head and firing chamber bottom upon which the dental object is placed, wherein the firing chamber head for operating the device for drying is preferably spaced apart from the firing chamber bottom a few centimeters.

7. The device according to claim 1, wherein the thermal energy source comprises an infrared light source.

8. The device according to claim 1, wherein the temperature sensor is responsive to a radiation with a wavelength between 780 nm and 1 mm.

9. The device according to claim 1, wherein the temperature sensor is responsive to a radiation with a wavelength between 800 nm and 15 µm.

10. The device according to claim 1, wherein the temperature sensor is arranged outside the impingement area which is impinged with the thermal energy and is directed toward it.

11. The device according to claim 1, wherein the thermal energy source comprises at least one heating element (50) located in a dental firing furnace and that the temperature sensor detects the temperature of the dental object through a gap formed between a firing chamber head and a firing chamber base.

12. The device according to claim 1, wherein the thermal energy source comprises at least one heating element (50) located in a dental firing furnace and that the temperature sensor detects the temperature of the dental object through a viewing channel in the dental firing furnace that is covered with transparent glass.

13. The device according to claim 1, wherein the device comprises a blower or an air acceleration device for the drying process, and/or a suction or exhaust device by which an air stream across the dental object may be generated for enhancing the drying process.

14. The device according to claim 1, wherein the dental object is formed as a dental restoration part that comprises a porosity.

15. The device according to claim 1, wherein the dental object comprises ceramics, metal, plastic or mixtures of these materials.

16. The device according to claim 1, wherein the dental object is formed as a dental restoration part that is a ceramic green body comprising ceramic particles and a solid organic matrix, wherein the solid organic matrix comprises at least one organic compound.

17. The device according to claim 1, wherein the control circuit controls the thermal energy source to a temperature that is above the boiling point of the liquid.

18. The device according to claim 1, wherein the control circuit controls the thermal energy source to a temperature that is 30 to 50° C. above the boiling point of the liquid.

19. The device according to claim 1, wherein the temperature sensor comprises a thermal imaging camera.

20. A dental furnace comprising
- a firing chamber having a thermal energy source configured for acting upon a dental object and generating thermal energy at a constant rate throughout a drying process of the dental object and for increasing a temperature of the liquid in the dental object to a boiling point,
- an impingement area for impinging on the dental object with the thermal energy,
- a control circuit configured to detect a temperature plateau and control the thermal energy source to provide thermal energy at the constant rate during the drying process, and
- a temperature sensor in communication with the control circuit to measure the temperature of the dental object and detect the temperature plateau whereby no further increase in temperature of the dental object is detected despite the thermal energy supplied at the constant rate, wherein the temperature plateau is no higher than 500° C., and upon reaching the temperature plateau, the control circuit emits a signal to indicate drying is complete, and the drying is stopped.

21. The dental furnace according to claim 20 further comprising
- a firing chamber head which can be suspended above a firing chamber bottom to provide a gap between the firing chamber bottom and the firing chamber head, and
- wherein the temperature sensor is directed at the dental object through the gap.

22. The dental furnace according to claim 21 wherein the temperature sensor comprises a thermal imaging camera.

* * * * *